Figure 1:
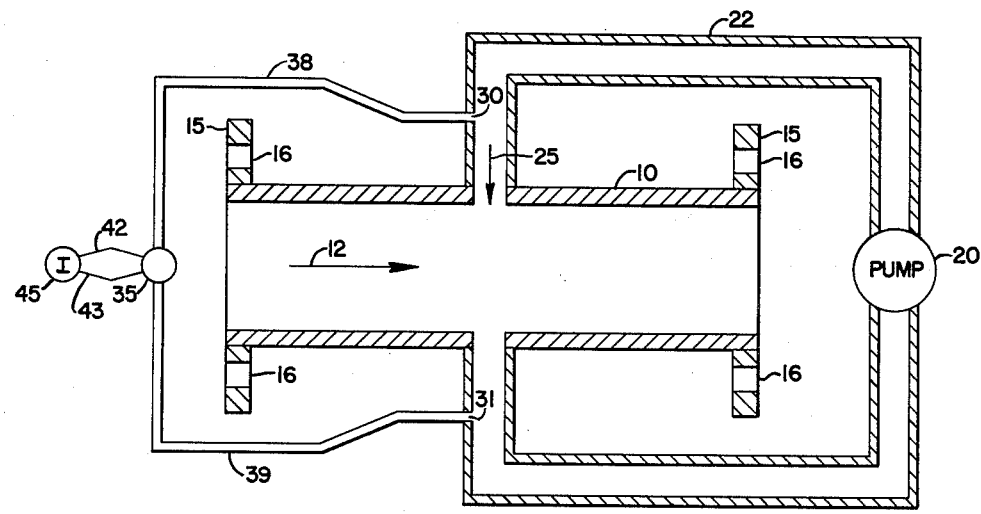

Sept. 3, 1963     J. H. PRINDLE     3,102,423
MASS FLOWMETER
Filed June 13, 1960

INVENTOR.
JAMES H. PRINDLE
BY Charles J. Ungemach
ATTORNEY

United States Patent Office 3,102,423
Patented Sept. 3, 1963

3,102,423
MASS FLOWMETER
James H. Prindle, Poulsbo, Wash., assignor to Minneapolis-Honeywell Regulator Company, Minneapolis, Minn., a corporation of Delaware
Filed June 13, 1960, Ser. No. 35,744
6 Claims. (Cl. 73—194)

The present invention relates to flowmeters and, more particularly, to flowmeters for measuring mass rate of flow.

In the past, several types of flowmeters have been utilized to measure mass rate of flow. Many of these give an output which is proportional to the product of density and velocity squared and thus require independent apparatus for measuring velocity. Volumetric flowmeters have also been used but these require an independent measurement of density. One type of flowmeter which gives a direct measurement of flow rate has been devised which involves placing a turbine in the fluid stream to be measured and imparting a velocity to the fluid in a direction normal to the direction of fluid flow. The torque created is measured at some point down stream as an indication of mass flow rate. This type flowmeter has the disadvantage of requiring considerable apparatus to be mounted in the fluid stream and further, can only be used with a fluid flowing in one direction.

The present invention, which I will refer to as a transverse momentum flowmeter, overcomes these disadvantages and provides a flowmeter in which an output proportional to mass flow rate is obtained without requiring any independent velocity or density measurements and without requiring any apparatus to be placed in the fluid stream to be measured.

The transverse momentum flowmeter of the present invention makes use of the fact that when a fluid stream is forced at right angles across another stream both streams undergo a pressure drop. The pressure drop is proportional to the momentum transferred and the drop in one stream is equal to the product of its velocity, the velocity of the other stream, and the density of the fluid. By knowing the velocity of one of the streams, the pressure drop in that one will give the product of density and velocity hence the mass rate flowing in the other stream. Expressed mathematically, $$\Delta P = \rho v V K + C$$

where V is the velocity of the first or main stream, $v$ is the velocity of the second or cross stream, $\Delta P$ is the pressure drop in the cross stream, C is a constant and is representative of the pressure drop when V is zero, and $\rho$ is the density of the fluid. It is seen that if $v$ is held constant, $\Delta P$ is proportional to $\rho V$, or in other words, to the mass rate of flow in the main stream.

The value of K is an empirical constant of calibration which is determined by the geometry of the apparatus and the character of the flow. Further, $$\frac{\Delta P}{v} = \rho V K$$

which is also linearly proportional to the mass flow rate in the first or main stream, is an expression of the impedance to the flow of the second or cross stream.

Figure 2:
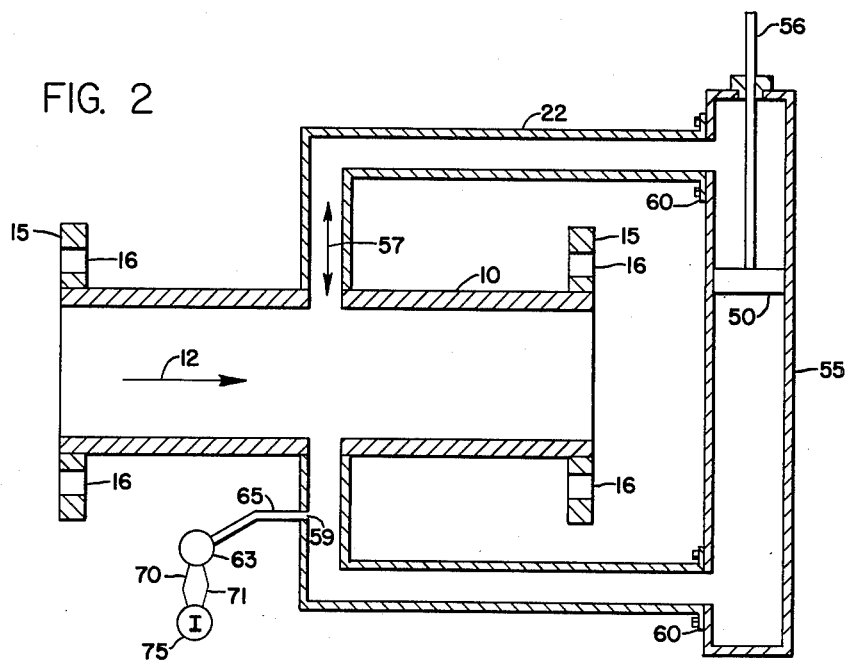

A more complete understanding of the present invention will be obtained upon examination of the accompanying specification, claims and drawings, in which:

FIGURE 1 shows a cross-sectional view of one embodiment of the present invention, and FIGURE 2 shows a cross-sectional view of an alternate embodiment.

In FIGURE 1, a flow section or conduit 10 is shown in which a fluid the mass rate of flow of which is to be determined, is flowing. The direction of flow is arbitrary, and may be presumed to be in a direction shown by arrow 12. Conduit 10 has flanges 15 on either end, which flanges are provided with holes 16 for connection into a piping system.

A constant velocity fluid motive means such as pump 20 is shown connected by means of a second conduit 22 to conduit 10. Pump 20 is operable to cause a fluid stream to flow in conduit 22 and across the fluid flowing in conduit 10 at right angles to the direction of flow 12. The direction of the cross flow in conduit 22 is likewise arbitrary and may be shown by arrow 25. It is obvious that intermixing of the fluids in conduits 10 and 22 will occur so that substantially the same fluid with the same density will be flowing in both conduits during normal operation.

It has been observed that a pressure drop occurs in both streams across the common junction section of conduits 10 and 22 which is proportional to the momentum imparted to the fluid in conduit 10 and hence, mass rate of flow. Accordingly, a differential pressure measurement may be made in either stream on opposite sides of the common junction section of the two conduits to obtain the requisite indication. Since the cross-sectional area of conduit 22 is smaller than the cross-sectional area of conduit 10, the pressure drop in conduit 22 will normally be greater than that in conduit 10 and will thus provide more accurate readings. As shown in FIGURE 1, ports 30 and 31 are provided in conduit 22 on opposite sides of conduit 10. Suitable pressure measuring apparatus such as a differential manometer 35 is shown connected to ports 30 and 31 by conduits 38 and 39 respectively. Manometer 35 may provide a visible signal indicative of the difference in pressure between ports 30 and 31 by the conventional U tube arrangement or as shown in FIGURE 1 may provide an electrical signal output on conductors 42 and 43 so as to position an indicator 45 in accordance with the differential pressure. Indicator 45 may be suitably calibrated in increments of mass rate of flow. Since conduit 22 is smaller than conduit 10, only a fraction of the fluid flowing in conduit 10 is disturbed by the cross flow.

Attention is now drawn to FIGURE 2 where similar apparatus is shown but which requires only a single pressure measuring point. In FIGURE 2, the apparatus which is the same as that in FIGURE 1 will be given the same reference numeral. The pump 20 of FIGURE 1 has been replaced by a piston 50 which is driven back and forth in a chamber 55 by a rod 56 which is connected to suitable driving means not shown. Chamber 55 is connected to conduit 22 by suitable means such as bolted flanges 60. As piston 50 moves back and forth, fluid is driven first in one direction and then the other through conduit 22 and across the stream of fluid in conduit 10 as shown by arrow 57. This reciprocating motion of the fluid will cause a pressure change in conduit 22 first in one sense and then in the opposite sense.

A port 59 is provided in conduit 22 and a suitable pressure measuring device 63 is connected thereto by means of a conduit 65. The pressure sensed at port 59 will first be large when the fluid is going clockwise through conduit 22 and then small as fluid goes counterclockwise. The result is that the pressure measuring apparatus 63 will give an alternating output the peak-to-peak value of which is indicative of the pressure drop across the fluid flowing in conduit 10 and thus indicative of the mass rate of flow thereof. By moving piston 50 in a sinusoidal fashion, the output from pressure measuring apparatus 63 will also be sinusoidal. This output may appear as an electrical signal on conductors 70 and 71 so as to position a suitably calibrated indicator 75.

Thus it is seen that a simple, economical and easily assembled mass rate flowmeter has been provided in which no auxiliary measurements of density or velocity need be made and in which no apparatus is mounted within the main conduit.

The foregoing disclosure has been presented for illustrative purposes only and is not intended to be limiting. Many changes in detail, especially in matters of shape, size and arrangement of parts will occur to those skilled in the art without departing from the principle of the invention. I therefore intend only to be limited by the following claims.

I claim:

1. Apparatus for measuring the mass rate of flow of fluid in a first stream in a first conduit comprising, in combination: a constant velocity pump; means connecting said pump so as to cause a second stream of flow to flow through said first stream between second conduits situated at right angles to the first stream; and means measuring the differential pressure between two points in the second conduits containing said second stream on opposite sides of said first stream as an indication of the mass rate of flow of said first stream.

2. Apparatus of the class described comprising, in combination: a first conduit in which a fluid is flowing in a first stream; a second conduit connected to said first conduit at first and second positions; fluid motive means connected to said second conduit and operable to cause fluid to flow through said first conduit between said first and second positions in a direction transverse to said first stream; and means sensing the pressure differential of the fluid in said second conduit on opposite sides of said first stream as an indication of the mass rate of flow of the fluid flowing in said first stream.

3. Apparatus for determining the mass rate of flow of a fluid in a first stream comprising, in combination: a first conduit through which the first stream flows, said first conduit having first and second ports situated on opposite portions thereof; a second conduit connected to the first port; a third conduit connected to the second port; fluid motive means connected to said second and third conduits and operable to induce a flow of fluid in a second stream through said second and third conduits, said second stream imparting a transverse momentum to the fluid in the first stream; and pressure measuring means operatively connected to measure pressure variations in said second stream as an indication of the mass rate of flow of the fluid in the first stream.

4. A flowmeter comprising, in combination: a first conduit adapted to house a first stream of fluid; a second conduit connected to said first conduit at opposite portions of said first conduit; fluid motive means connected to produce a flow of fluid in said second conduit so as to impart a transverse momentum to the fluid in the first stream; and means for sensing the flow impedance to said transverse fluid flow as an indication of the mass rate of flow in the first stream.

5. Apparatus for determining the mass rate of flow of a first stream of fluid in a first conduit comprising, a plurality of cross flow conduit means connected to said first conduit; fluid motive means connected to said cross flow conduit means and operable to induce a flow of a second stream of fluid in the first conduit through said first stream of fluid between two of said conduit means in a direction transverse to the flow of said first stream of fluid; and pressure responsive means connected to said cross flow conduit means to determine pressure variations therein as an indication of the mass rate of flow of said first stream of fluid.

6. In a momentum transfer flowmeter for use with a first stream of fluid flowing in a first direction: means causing a second stream of fluid to flow through said first stream between first and second means for directing the flow of a fluid in a direction transverse to said first direction to impart transverse momentum to the fluid in said stream; and means connected for detecting the pressure drop of said second stream between said first and second fluid directing means as an indication of the transverse momentum imparted thereto and hence the mass rate of flow in said first stream.

References Cited in the file of this patent

UNITED STATES PATENTS

| | | |
|---|---|---|
| 2,514,235 | Genin et al. | July 4, 1950 |
| 2,570,410 | Vetter | Oct. 9, 1951 |
| 2,627,543 | Obermaier | Feb. 3, 1953 |
| 2,660,886 | Milmore | Dec. 1, 1953 |
| 2,896,450 | Mason | July 28, 1959 |